(12) United States Patent
Roberts et al.

(10) Patent No.: US 8,991,095 B2
(45) Date of Patent: Mar. 31, 2015

(54) FISHING LURE JIG HEAD

(75) Inventors: Branden Roberts, South Padre Island, TX (US); Eleno Salinas, South Padre Island, TX (US)

(73) Assignee: Logic Lures, Inc., South Padre Island ( * ) Notice: Subject to any disclaimer, the term of this patent is extended or adjusted under 35 U.S.C. 154(b) by 15 days.

(21) Appl. No.: 13/396,038

(22) Filed: Feb. 14, 2012

(65) Prior Publication Data

US 2012/0204472 A1 Aug. 16, 2012

Related U.S. Application Data

(60) Provisional application No. 61/443,359, filed on Feb. 16, 2011.

(51) Int. Cl.
*A01K 83/06* (2006.01)
*A01K 85/00* (2006.01)

(52) U.S. Cl.
CPC .................................. *A01K 85/00* (2013.01)
USPC ......... 43/44.8; 43/42.39; 43/42.37; 43/42.41; 43/44.81

(58) Field of Classification Search
USPC ................ 43/44.2, 44.8, 42.24, 42.39, 42.15, 43/43.16, 44.81, 42.37, 42.38, 42.41, 42.1
See application file for complete search history.

(56) References Cited

U.S. PATENT DOCUMENTS

| | | | |
|---|---|---|---|
| 1,144,756 A | 6/1915 | Damsma | |
| 1,611,644 A * | 12/1926 | Johnson | 43/42.06 |
| 1,892,892 A * | 1/1933 | Jamar, Jr. | 43/42.15 |
| 2,183,816 A * | 12/1939 | Lovelace | 43/42.08 |
| 2,196,376 A * | 4/1940 | Anderson | 43/44.2 |
| 2,238,832 A | 4/1941 | Thoren | |
| 2,262,974 A * | 11/1941 | Steiner | 43/42.48 |
| 2,609,633 A | 9/1952 | Cracker | |
| 2,636,307 A | 4/1953 | Mason et al. | |
| 2,734,301 A | 2/1956 | Fuqua | |
| 2,794,288 A | 6/1957 | Marshall et al. | |
| 2,850,834 A | 9/1958 | Parrish | |
| 2,986,837 A | 6/1961 | Spugios | |
| 3,426,467 A * | 2/1969 | Bryant | 43/42.28 |
| 3,426,468 A | 2/1969 | Hinkson | |
| 3,740,891 A | 6/1973 | Rubenstein | |
| 3,760,525 A * | 9/1973 | Daughtry | 43/44.2 |
| 3,803,747 A * | 4/1974 | Cartwright | 43/42.28 |
| 3,854,233 A | 12/1974 | Browning, III | |
| 3,893,255 A | 7/1975 | Hicks | |
| 3,908,298 A | 9/1975 | Strader | |
| 4,164,826 A * | 8/1979 | Metzler et al. | 43/42.05 |
| 4,221,069 A | 9/1980 | Esses | |
| 4,554,756 A | 11/1985 | Thomas | |
| 4,785,569 A | 11/1988 | Thomas, Jr. | |

(Continued)

FOREIGN PATENT DOCUMENTS

JP 2002-112684 A 4/2002

*Primary Examiner* — Darren W Ark
*Assistant Examiner* — Lisa Tsang
(74) *Attorney, Agent, or Firm* — Howard & Howard Attorneys PLLC

(57) ABSTRACT

A fishing lure includes a weighted body, a first eye hook, a second eye hook, and a fish hook. The weighted body has a first end and a second end. The first eye hook is coupled near the first end of the weighted body. The second eye hook is coupled near the second end of the weighted body. The fish hook has an eyelet formed at one end. The eyelet is coupled to the second eye hook allowing the fish hook to freely move about the eyelet.

10 Claims, 2 Drawing Sheets

(56) References Cited

U.S. PATENT DOCUMENTS

| | | | | |
|---|---|---|---|---|
| 4,791,749 A | | 12/1988 | Stazo | |
| 4,848,023 A | | 7/1989 | Ryder et al. | |
| 4,850,132 A | * | 7/1989 | Motyka | 43/44.2 |
| 4,918,854 A | * | 4/1990 | Webre, Jr. | 43/42.31 |
| 4,920,688 A | | 5/1990 | Devereaux et al. | |
| 5,081,786 A | | 1/1992 | Cobb | |
| 5,094,026 A | | 3/1992 | Correll et al. | |
| 5,117,574 A | | 6/1992 | Perry | |
| 5,144,765 A | | 9/1992 | Keeton | |
| 5,299,378 A | | 4/1994 | Ballard | |
| 5,305,543 A | * | 4/1994 | Fore | 43/43.13 |
| 5,355,616 A | | 10/1994 | Parker | |
| 5,491,927 A | * | 2/1996 | Ortiz | 43/42.28 |
| 5,661,922 A | | 9/1997 | Bonomo | |
| 5,881,490 A | | 3/1999 | Richardson | |
| 6,061,948 A | | 5/2000 | Boucek | |
| 6,185,857 B1 | | 2/2001 | Hnizdor | |
| 6,230,433 B1 | | 5/2001 | Nichols | |
| 6,301,822 B1 | | 10/2001 | Zernov | |
| 6,766,608 B1 | * | 7/2004 | Jelmyer | 43/44.2 |
| 7,028,430 B2 | * | 4/2006 | Gironda | 43/42.22 |
| 7,117,629 B2 | | 10/2006 | Brzozowski | |
| 2006/0143973 A1 | | 7/2006 | Corbitt, III | |
| 2008/0000141 A1 | * | 1/2008 | Hair et al. | 43/42.14 |
| 2008/0148623 A1 | | 6/2008 | Uhrig | |
| 2008/0202018 A1 | | 8/2008 | Gill | |
| 2008/0236022 A1 | | 10/2008 | Harrell | |
| 2009/0077859 A1 | * | 3/2009 | Aylsworth | 43/42.39 |
| 2010/0229454 A1 | | 9/2010 | Cunningham | |
| 2011/0094144 A1 | | 4/2011 | Bloomfield | |
| 2012/0017489 A1 | * | 1/2012 | Partridge | 43/42.39 |

* cited by examiner

FISHING LURE JIG HEAD

RELATED APPLICATIONS

The present application claims priority to U.S. Provisional Patent Application Ser. No. 61/443,359, filed Feb. 16, 2011, which is hereby incorporated by reference.

FIELD OF THE INVENTION

The present invention relates generally to a fishing lure, and more particularly, to a fishing lure jig head with a non-fixed hook.

BACKGROUND OF THE INVENTION

Fishing remains one of the most popular sports. When fishing for game fish, one of the best baits available is usually live bait. The motion provided by live bait appears to be more attractive to the fish than artificial lures or bait. However, live bait has its own inconveniences, including availability and cost, as well as requiring a means to keep the live bait fresh during transport and fishing.

One type of a fishing lure is known as a jig or jig head. Typically, the jig head includes a lead sinker with a hook molded into it. The jig head is typically covered by a bait element. The bait element may be comprised of a soft body to attract fish. The jig head may include an eyelet to which a fishing line is fixed.

The elements of the jig head are generally rigidly fixed with respect to one another. In other words, the eyelet is rigidly fixed with respect to the lead sinker and the hook is rigidly fixed to the lead sinker. This allows only limited motion of the hook, i.e., a pivoting motion, relative to the lead sinker.

As a result, in order to create a more life-like motion of the jig as it moves through the water requires additional elements connected to the fishing rig, such as opposed spinnerbaits to create a jerky, unpredictable motion to attract more fish.

These types of jig head fishing lures do not provide very life-like movement of the lure when in use. The present invention is aimed at the problem identified above.

SUMMARY OF THE INVENTION

In one aspect of the present invention, a fishing lure is provided. The fishing lure includes a weighted body, a first eye hook, a second eye hook, and a fish hook. The weighted body has a first end and a second end. The first eye hook is coupled near the first end of the weighted body. The second eye hook is coupled near the second end of the weighted body. The fish hook has an eyelet formed at one end. The eyelet of the fish hook is coupled to the second eye hook allowing the fish hook to freely move about the eyelet.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF INVENTION

With reference to the drawings, and in operation, the present invention provides a fishing lure jig head 10, which may be used for sports fishing.

The fishing lure jig head 10 includes a weighted body 12. The weighted body 12 has a first or front end 14 and a second or back end 16.

Figure 2:
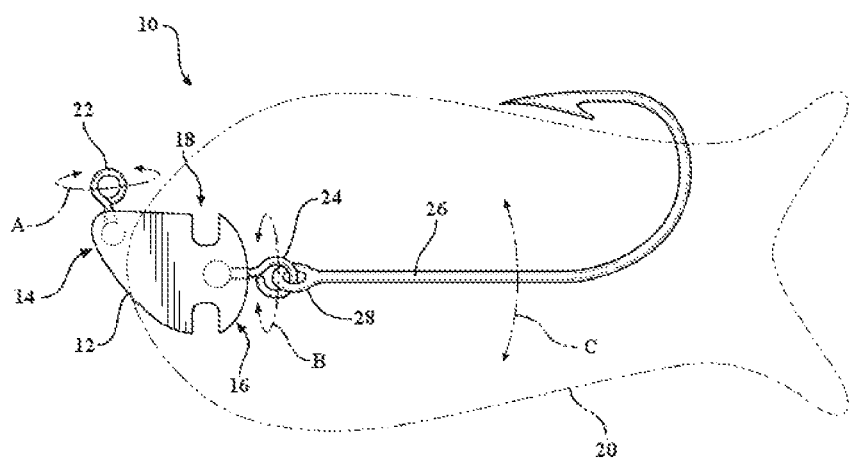
FIG. 2 is an illustration of the fishing lure jig head of FIG. 1, with the outline of a bait removedly affixed thereto.
Figure 4:
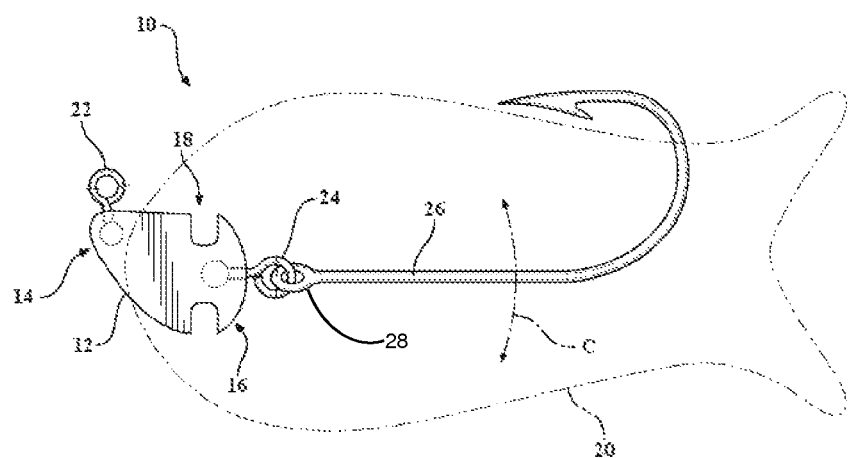

The weighted body 12 may include a groove or barb 18, which may extend all or part way around thereof. As shown in FIGS. 2 and 4, jig head 10, in use, may be inserted within bait 20, which may be live or fake. The groove 18 assists in keeping the bait 20 affixed to the jig head 10. Generally, the weight body 12 is made from a heavy metal, such as lead, but any suitable material may be used.

Figure 1:
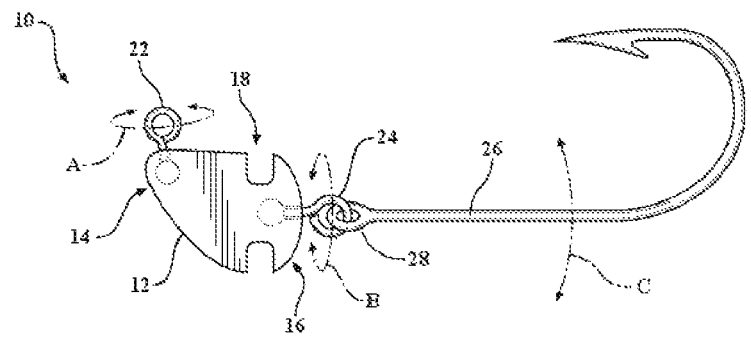
FIG. 1 is an illustration of a fishing lure jig head, according to an embodiment of the present invention.
Figure 3:
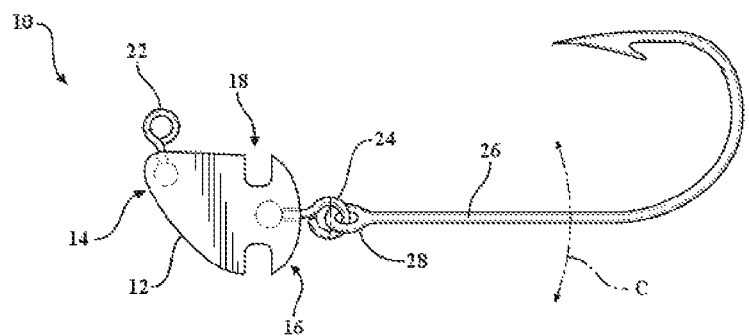
FIG. 3 is an illustration of a fishing lure jig head, according to another embodiment of the present invention; and, FIG. 4 is an illustration of the fishing lure jig head of FIG. 3, with the outline of the bait removedly affixed thereto.

An eye hook 22 is affixed to the front end 14 of the weighted body 12. In one embodiment, shown in FIGS. 3 and 4, the eye hook 22 is fixed with respect to the weighted body 12. In another embodiment, shown in FIGS. 1 and 2, the eye hook 22 is a swiveling eye hook which allows the weighted body 12 to freely rotate about the eye hook 22 (as indicated by Arrow A). The eye hook 22 is generally comprised of a single piece of wire with first and second ends. The eye hook 22 could be configured with one or both ends entering the weighed body 12 and being anchored into the head of the jig.

A second eye hook 24 is affixed to the back end 16 of the weighted body 12. In one embodiment, shown in FIGS. 3 and 4, the eye hook 24 is fixed with respect to the weighted body 12. In another embodiment, shown in FIGS. 1 and 2, the second eye hook 24 may also be a swiveling eye hook which freely rotates about the weighted body 13 (as indicated by Arrow B).

In another words, both the first and second eye hooks 22, 24 can rotate about the weighted body 12 over 360 degrees.

In the illustrated embodiment, a fishing hook 26 is affixed to the second eye hook 24 by a fastening means 28. The fastening means 28 allows the fishing hook 26 to pivot about the second eye hook 24 (as indicated by Arrow C). The fastening means 28 may be comprised of an eyelet formed by one end of the fishing hook 26.

The use of the rotating second eye hook 24 along with the pivoting fastener 28 provides more life-like movement within the lure 10.

INDUSTRIAL APPLICABILITY

With reference to the drawings and in operation, the present invention, provide a fishing lure 10 which exhibits, in use, a more life-like appearance. The fishing lure 10 may be fixed to a fishing line via a freely rotating eye hook (first eye hook 22). This allows the fishing lure 10 more freedom of motion while in the water. Additionally, a fishing hook 26 is fixed relative to the body of the fishing lure 10. This allows the fishing hook also to move more freely relative to the body of the lure.

Although the weighted body 12 is shown in the drawings with a particular shape, any suitable shape may be used. For example, the weighted body 12 may be round, conical or may have a fanciful shape, such as a fish head.

The weighted body 12 may be made, at least partly, out of rubber, or a rubber-like material, or silicon. The weighted body 12 may also be provided in different colors, via a paint or other coated applied thereto, or by any other suitable means may consist of many different shapes and colors along with different features.

While the invention has been described in detail with particular reference to the illustrated embodiment, many modifications and variations of the present invention are possible in light of the above teachings.

What is claimed is:

1. A fishing lure, comprising:
   bait; and,
   a jig head, the jig head including
   a weighted body, a first eye hook, a second eye hook, and a fish hook,
   the weighted body extending between a first end and an opposite second end which define a longitudinal axis of the weighted body therebetween, the weighted body having a length and a width, the length of the weighted body being parallel to the longitudinal axis and greater than the width of the weighted body, the weighted body being configured to be embedded within the bait and having a surface extending between the first end and the second end and a groove extending radially inwardly from the surface and substantially around the surface at a location between the first and second ends of the weighted body, the groove having opposing sidewalls which are parallel to each other and have equal heights as measured in a direction perpendicular to the longitudinal axis, the groove being configured to assist keeping the bait affixed to the weighted body, the groove having a first portion extending inward on the weighted body from a top edge of the surface and a second portion extending inward on the weighted body from a bottom edge of the surface, the top edge having a linear portion that is generally parallel to the longitudinal axis, the bottom edge having an arcuate shape which continuously curves and extending downward from the top edge toward the second end, the bottom edge being bisected by the longitudinal axis,
   the first eye hook fixedly coupled and non-rotatably anchored to the weighted body and positioned near the first end on the top edge, the first eye hook extending away from the top edge at a substantially right angle from the longitudinal axis, wherein the first eye hook is configured to receive a fishing line,
   the second eye hook fixedly coupled and non-rotatably anchored to the weighted body and positioned near the second end, the second eye hook extending away from a rear edge of the weighted body in a direction parallel to the longitudinal axis, the rear edge extending between the top edge and the bottom edge of the weighted body and having an arcuate shape defining a barb having a convex surface which protrudes toward the second eye hook and away from the groove and extends across the longitudinal axis,
   the fish hook having a single eyelet integrally formed at one end thereof, the eyelet being directly coupled to the second eye hook and configured to allow the bait to oscillate in relation to the second eye hook to provide life-like movement of the lure.

2. The fishing lure, as set forth in claim 1, wherein the weighted body is composed at least partly of a metal.

3. The fishing lure, as set forth in claim 1, wherein the weighted body is composed at least partly of one of rubber, rubber-like material, or silicon.

4. The fishing lure, as set forth in claim 1, wherein the first eye hook is separate from the second eye hook.

5. The fishing lure, as set forth in claim 1, wherein a first end of the first eye hook is coupled to the weighted body.

6. The fishing lure, as set forth in claim 5, wherein both the first end and a second end of the first eye hook are coupled to the weighted body.

7. The fishing lure, as set forth in claim 5, wherein the second eye hook includes a first end that is coupled to the weighted body and spaced a distance from the first end of the first eye hook along the longitudinal axis.

8. The fishing lure, as set forth in claim 7, wherein the second eye hook is orientated along the longitudinal axis, the first eye hook being spaced a distance above the horizontal axis.

9. The fishing lure, as set forth in claim 1, wherein the first eye hook is orientated perpendicular to the second eye hook.

10. The fishing lure, as set forth in claim 1, wherein the first eye hook is formed from a single wire having a first end and a second end, the first end being coupled to the weighted body.

* * * * *